United States Patent
Donoughe et al.

(10) Patent No.: US 6,223,793 B1
(45) Date of Patent: May 1, 2001

(54) AUTOMOTIVE VEHICLE REMOTE FILL RESERVOIR

(75) Inventors: Michael F Donoughe, Rochester; Daniel J Flesher, White Lake, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/504,918

(22) Filed: Feb. 16, 2000

(51) Int. Cl.⁷ .............................. B65B 39/00; B67C 11/04
(52) U.S. Cl. .......................... 141/338; 141/98; 141/331; 141/337; 141/340
(58) Field of Search ................................... 141/331–345, 141/386, 98; 184/106

(56) References Cited

U.S. PATENT DOCUMENTS

| | | |
|---|---|---|
| 1,420,039 * | 6/1922 | Horstkotte .............................. 141/338 |
| 2,637,513 | 5/1953 | Wallen . |
| 4,234,098 | 11/1980 | Miller et al. . |
| 4,811,763 | 3/1989 | Kupske . |
| 5,033,521 | 7/1991 | Martin . |
| 5,082,035 * | 1/1992 | Maxwell ............................... 141/98 |
| 5,857,504 * | 1/1999 | Tremblay ............................. 141/338 |

* cited by examiner

Primary Examiner—Timothy L. Maust
(74) Attorney, Agent, or Firm—Kenneth H. Maclean

(57) ABSTRACT

An automotive vehicle remote fill fluid reservoir is provided. In a preferred embodiment the fluid reservoir includes a main body to contain the fluid. A neck is fluidly connected with the main body and is inclined toward a region of the engine compartment which is more readily accessible. An extendable funnel is also provided which has flanges along its extreme ends to prevent the funnel from falling into the fluid reservoir or being inadvertently pulled out of the fluid reservoir. The funnel is flexible and has an outwardly flared upper end to prevent fluid spills.

16 Claims, 2 Drawing Sheets

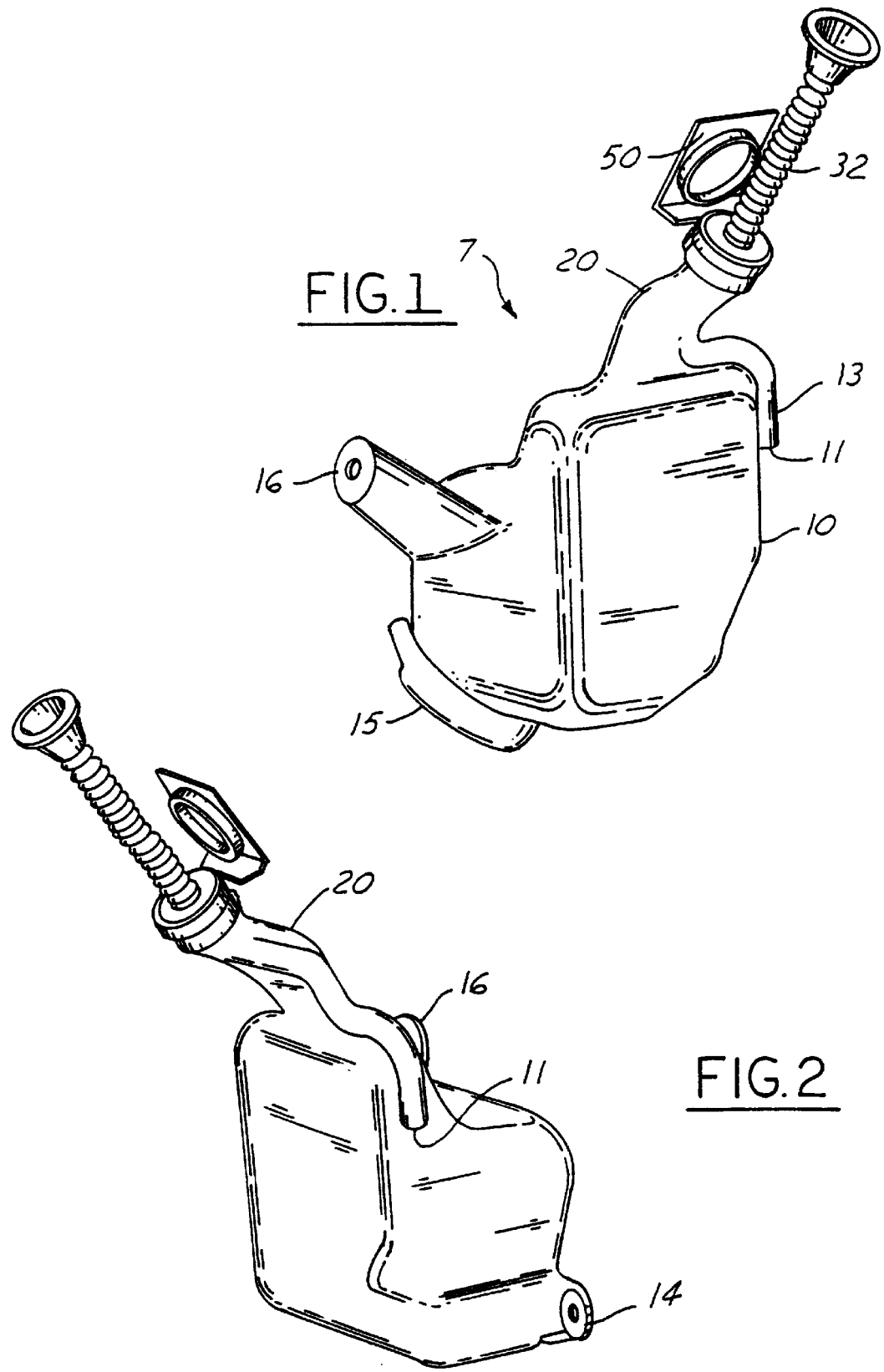

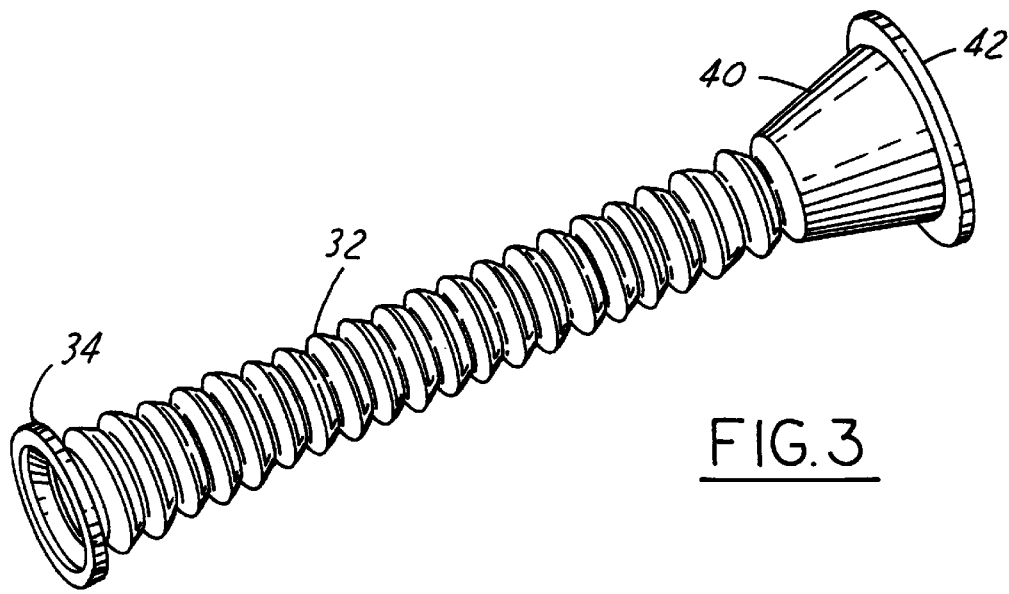
FIG.3
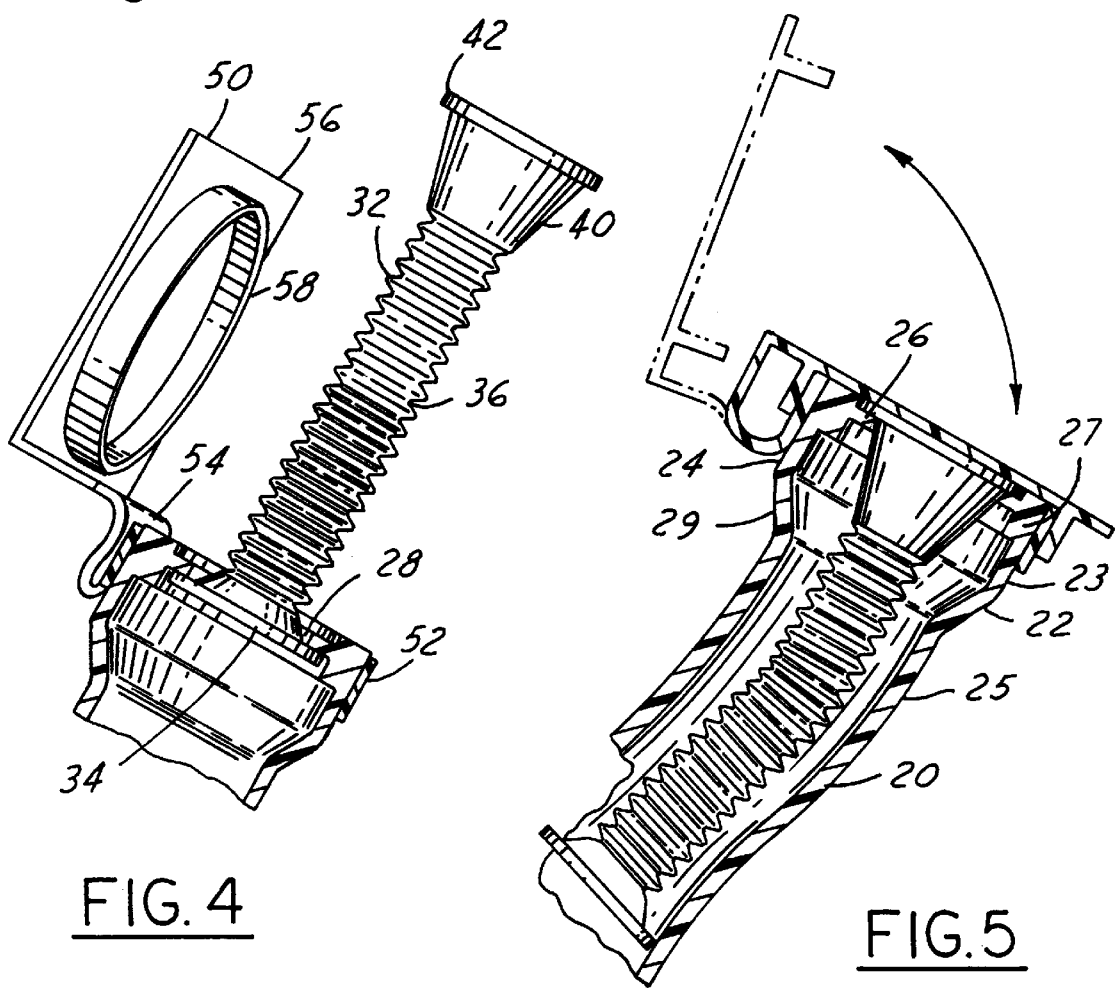
FIG.4
FIG.5

AUTOMOTIVE VEHICLE REMOTE FILL RESERVOIR

FIELD OF THE PRESENT INVENTION

The field of the present invention is that of remote fill containers for automotive vehicles. More particularly the field of the present invention is that of a remote fill reservoir useful for engine coolant overflow or windshield wiper fluid.

BACKGROUND OF THE INVENTION

The primary cause of vehicular accidents in the United States is driver error. To lower the rate of driver error it is important to eliminate as much as possible any interference with the driver's vision. Accordingly most if not all vehicles have a windshield wiper system equipped with a fluid reservoir located under the hood which can spray windshield wiper fluid onto the windshield. Windshield wiper fluid serves two major functions. The first function is to clean the windshield of dust, dirt, bugs or other foreign matter which can obscure the driver's vision. Additionally, the windshield wiper fluid is an antifreeze solution which is utilized to remove ice and snow from the windshield.

In the most recent quarter century, there has been a major effort to increase fuel economy of automotive vehicles. A major technical trend to increase fuel economy is to diminish the aerodynamic drag of the vehicle by lowering the hood region of the vehicle. A more rounded or pointed front end has replaced the box front end which was common on many earlier vehicles. Additionally, the grill area is typically smaller. The aerodynamic changes which have occurred on the front of the vehicle have resulted in a smaller volumetric space between the various components under the vehicle hood. Therefore, fluid reservoirs have to be placed in less optimal positions making filling the reservoirs much more difficult.

It is desirable that the windshield wiper fluid reservoir be as large as possible to reduce the frequency of refilling the reservoir. This is especially critical in long distance travel. It is also desirable that the windshield wiper fluid reservoir be placed in a region of the engine compartment which is readily accessible to fill by the vehicle operator regardless of the vehicle operator's height or reach. It is also desirable that the windshield wiper fluid reservoir be placed within a portion of a vehicle underneath the hood wherein there is already space available without requiring redesign or relocation of other engine compartment components of the vehicle.

Another fluid reservoir in the vehicle is the engine coolant overflow reservoir. To increase the efficiency of the vehicle most automotive engines have a pressurized engine coolant system. In a pressurized engine coolant system the amount of coolant in the engine and the radiator combined is not a constant. Accordingly, there is provided an overflow engine coolant reservoir. At certain points of operation of the vehicle, engine coolant will be sucked into the radiator from the engine coolant reservoir. At other times engine coolant will be pushed out of the radiator back into the engine coolant reservoir. When the engine coolant system is fully pressurized and the engine is hot, it can be hazardous to remove the radiator cap. Additionally, it is not always prudent to add low temperature engine coolant to the engine coolant system when the engine is hot. To prevent a vehicle operator from having to remove a radiator cap and to prevent the addition of cold coolant to a hot engine, engine coolant is typically added to the engine coolant overflow reservoir.

It is desirable that the engine coolant overflow reservoir be as large as possible so that a frequency of refilling the reservoir can be reduced. This is especially critical in vehicles which do not receive proper maintenance, since low coolant levels can lead to catastrophic failure of the engine. It is also desirable that the engine coolant overflow reservoir be placed in a region of the engine compartment which is readily accessible to fill by the vehicle operator regardless of the vehicle operator's height or reach. It is also desirable that the engine coolant overflow reservoir be convenient to fill, thereby eliminating spills of expensive engine antifreeze and the resultant unpleasant odor from engine coolant on a hot engine block. It is also desirable that the engine coolant overflow reservoir be placed within a portion of a vehicle underneath the hood wherein there is already space available without requiring redesign or relocation of other engine compartment components of the vehicle.

SUMMARY OF THE INVENTION

To make manifest the above noted and other desires, the revelation of the present invention is brought forth. The present invention provides a freedom to provide the relatively large fluid reservoir by allowing it to be remotely located in a region of the engine compartment where space is already available. A neck fluidly connected with a main body of the reservoir has an opening orientated toward a region of the engine compartment, which is easily accessible by operators of various heights and reach. In addition, the fluid reservoir of the present invention has a flexible extendable funnel which further facilitates convenient filling. A cap of the fluid reservoir can be color coded to make it readily recognizable in the engine compartment. In a preferred embodiment a fluid reservoir of the present invention includes an aforementioned main body to contain the windshield wiper fluid or engine coolant antifreeze. A neck is fluidly connected with the main body and is inclined to a region of the engine compartment which is more readily accessible. An extendable funnel is also provided which has flanges along its extreme end to prevent the funnel falling into the fluid reservoir or being inadvertently pulled out of the fluid reservoir. Furthermore to add to the convenience of filling the fluid reservoir, the funnel is flexible and has an outwardly flared upper end to prevent spills of windshield wiper fluid or engine coolant antifreeze.

It is an object of the present invention to provide a remote fill fluid reservoir for an automotive vehicle.

It is an object of the present invention to provide a remote fill windshield wiper fluid reservoir.

It is an object of the present invention to provide a remote fill fluid reservoir which has an extendable funnel.

It is an object of the present invention to provide a remote fill engine coolant overflow reservoir.

The above noted and other objects of the present invention will become apparent to those skilled in the art from a review of the invention as it is provided in the accompanying drawings and detailed description of a preferred embodiment.

BRIEF DESCRIPTION OF THE DRAWINGS

FIG. 1 is a side perspective view of a preferred embodiment remote fill automotive vehicle fluid reservoir according to the present invention.

FIG. 2 is another perspective view of the fluid reservoir shown in FIG. 1 from a different angle.

FIG. 3 is an enlarged perspective view of an extendable funnel utilized in the fluid reservoir of the present invention.

FIG. 4 is an enlarged sectional view of the funnel shown in FIG. 3 extended from a neck portion of the fluid reservoir when the funnel has been extended to receive fluid.

FIG. 5 is a sectional view similar to that of FIG. 4 showing placement of the funnel within the neck of the fluid reservoir and the closing of the opening of the neck by a cap which is connected to an extreme end of the neck of the fluid reservoir.

DETAILED DESCRIPTION OF THE DRAWINGS

Referring to FIGS. 1–5, an automotive vehicle remote fill reservoir 7 according to the present invention has a generally rigid main body 10. The main body 10 forms a control volume to contain a fluid. The main body 10 is made of blow or injection molded plastic. The main body 10 has two attachment flanges 14 and 16 to allow the fluid reservoir 7 to be attached within the engine compartment of a vehicle (not shown).

Fluidly connected with the main body 10 is a neck 20. The neck 20 is formed integral with the main body 10. The neck 20 is inclined from the main body 10 and has an extending axis with a generally curvilinear shape. The neck 20 and the main body 10 provide a fill volume of approximately 1¼ gallons for an engine coolant reservoir or for a windshield wiper fluid reservoir. A top end 22 of the neck 20 has an enlarged head 24 which consists of a cylindrical portion 23 and a conical portion 29. Head 24 has an inwardly extending angular flange 26. The top extreme end of the neck 20 away from the main body 10 has an opening 28.

The next major component of the invention is a flexible funnel 32. At a lower extreme end the funnel 32 has a flange 34. The lower flange 34 has a slight interference fit with portion 25 of the neck 20. The funnel 32 will typically be fabricated from a polymeric or elastomeric material. To add to its flexibility, funnel 32 has corrugations 36. A top end of the funnel 32 has an outwardly flared portion 40 which terminates in an outwardly extending upper flange 42. The upper flange 42 prevents the funnel (top end) from falling into the neck and main body.

The fluid reservoir 7 also has a cap 50. The cap 50 will typically be fabricated from plastic. The cap has an annular band 52 which connects the cap 50 to the head 24 of the neck. The annular band 52 is connected to the head 24 by an adhesive, sonic welding or other connective techniques. The annular band 52 is formed integral with the cap 50. The cap 50 has a folding link portion 54. The folding link portion 54 connects the annular band of the cap with a top hat 56 of the cap. Extending from the top hat 56 is an annular aligning and/or sealing band 58.

In operation, the cap 50 will be closed upon the opening 28 of the neck. In the closed position, the aligning band 58 has a snug fit on the connective band 52 to retain the cap 50 in its closed position as shown in FIG. 5. The cap 50 will typically be fabricated from a light colored material so that it is readily visually perceived in the engine compartment of the vehicle. An additional function of the cap 50 in a closed position is to retain in a slight interference fit the flange 42 of the funnel against the inwardly extending flange 26 of the neck. This helps to hold the funnel in a stationary position and prevents the funnel 32 from readily rattling inside the neck 20.

To remove the cap 50 from the opening 26 the cap is flipped counterclockwise as shown in FIG. 5. The vehicle operator can then stick a finger within the outwardly flared portion 40 of the funnel and pull the funnel 32 outwardly. The funnel 32 is flexible to navigate the curvilinear bend of the neck 20. As previously mentioned, the funnel lower flange 34 has a slight interference fit with the portion 25 of the neck. As the funnel 32 is pulled outward, lower flange 34 is captured within the conical portion 29 of the neck. The funnel 32 will then be held in a generally upright position. The lower flange 34 as shown in FIG. 4 also prevents the funnel 32 from being inadvertently pulled out by contact with the inwardly extending flange 26 of the neck. The lower flange 34 is sized that it is retained in the conical portion 29 of the neck so that the funnel may be pivoted to accommodate the filling process by the vehicle operator. The funnel 32 can be bent to further accommodate the height and reach constraints of different vehicle operators. Additionally, the funnel outward flared portion 40 will accommodate most reservoir openings of windshield wiper fluid or engine coolant (antifreeze) to minimize possible spills. After the windshield fluid reservoir 7 has been filled, the funnel 32 is then pushed back into the neck 20. The cap 50 is then pivoted toward the neck head 24 placing the alignment band 58 adjacent to the connective band 52.

When it is desirable to utilize the reservoir 7 as an engine coolant reservoir, a line 13 having an opening 11 exposes the main body 10 to the atmosphere. A line 15 which is fluidly connected with the bottom of the main body 10 allows fluid from the radiator to be delivered to the reservoir 7. If it is desirable to utilize the reservoir 7 as a windshield wiper fluid reservoir the lines 15 and 11 are simply plugged by an external plug or plugged within the fabricating mode. It is obvious to those skilled in the art that it may also be preferable to customize the selection of plastics according to the utilization of the reservoir for windshield wiper fluid or for engine coolant.

The present inventive automotive vehicle remote fill fluid reservoir has been shown in a preferred embodiment. However, it will be apparent to those skill in the art, that various modifications can be made to the present invention without departing from the spirit or scope of the present invention as it is encompassed in the specification and drawings and by the following claims.

What is claimed is:

1. A remote fill reservoir for a fluid in an automotive vehicle comprising:

a generally rigid main body forming a control volume for containing said fluid;

a neck fluidly connected with said main body, said neck having an opening at an extreme end of said neck away from said main body with an inwardly extending flange and said neck having an enlarged portion adjacent said opening; and a flexible extendable funnel slidably mounted within said neck, said funnel being extendable to allow said main body to be filled from a remote location, said funnel having an upper end with an outwardly extending flared portion for receiving fluid, and said funnel at said upper end having an extending flange to prevent said upper end of said funnel from falling into said neck, and said funnel having an outwardly extending lower flange adjacent a lower end of said funnel to prevent inadvertent removal of said funnel from said neck, and said lower flange being captured in said neck enlarged portion when said funnel is extended.

2. A remote fill reservoir for a fluid in an automotive vehicle as described in claim 1 wherein said fluid is windshield wiper fluid.

3. A remote fill reservoir for a fluid in an automotive vehicle as described in claim 1 wherein said fluid is an engine coolant.

4. A remote fill reservoir for a fluid in an automotive vehicle as described in claim 1 wherein said neck is inclined.

5. A remote fill reservoir for a fluid in an automotive vehicle as described in claim 1 wherein said neck is curvilinear.

6. A remote fill reservoir for a fluid in an automotive vehicle as described in claim 1 wherein said funnel is corrugated.

7. A remote fill reservoir for a fluid in an automotive vehicle as described in claim 1 wherein said funnel flange along said lower end has a slight interference with said neck.

8. A remote fill reservoir for a fluid in an automotive vehicle as described in claim 1 further including a cap for covering said opening of said neck.

9. A remote fill reservoir for a fluid in an automotive vehicle as described in claim 8 wherein said cap has an integral band which is connected to and surrounding said neck.

10. A remote fill reservoir for a fluid in an automotive vehicle as described in claim 9 wherein said cap has an annular alignment band which meets with said band connecting said cap to said neck.

11. A remote fill reservoir for a fluid in an automotive vehicle as described in claim 1 wherein said funnel is corrugated.

12. A remote fill reservoir for a fluid in an automotive vehicle comprising:

a generally rigid main body forming a control volume for containing a fluid;

a neck fluidly connected with said main body, said neck having an opening at an extreme end away from said main body with an inwardly extending flange;

a flexible funnel slidably mounted within said neck, said funnel being extendable to allow said main body to be filled from a remote location, said funnel having an outwardly extending flange along a lower end of said funnel to prevent inadvertent removal of said funnel from said neck; and a cap for covering said opening in said neck, said cap having an integral band which is connected to and surrounding said neck.

13. A remote fill reservoir for a fluid in an automotive vehicle as described in claim 12 wherein said funnel adjacent an upper end of said funnel has a flange and said cap captures said upper end flange of said funnel against said flange of said neck.

14. A remote fill reservoir for a fluid in an automotive vehicle as described in claim 12 wherein said funnel has an upper end which is flared outwardly.

15. A remote fill reservoir for a fluid in an automotive vehicle comprising:

a generally rigid main body forming a control volume for containing a fluid;

a neck with a curvilinear extending axis fluidly connected with said main body, said neck having an opening at an extreme end away from said main body with an inwardly extending flange;

a flexible funnel slidably mounted within said neck, said funnel being extendable to allow said main body to be filled from a remote location, said funnel having an outwardly extending flange along a lower end of said funnel to prevent inadvertent removal of said funnel from said neck.

16. A remote fill reservoir for a fluid in an automotive vehicle as described in claim 15 wherein said funnel has an upper flange to prevent an upper end of said funnel from falling into said neck.

* * * * *